(12) United States Patent
Kikuchi

(10) Patent No.: US 10,193,471 B2
(45) Date of Patent: Jan. 29, 2019

(54) INSULATED DC/DC CONVERTER, AND POWER ADAPTOR AND ELECTRONIC DEVICE USING THE SAME

(71) Applicant: ROHM CO., LTD., Ukyo-ku, Kyoto (JP)

(72) Inventor: Hiroki Kikuchi, Kyoto (JP)

(73) Assignee: ROHM CO., LTD., Kyoto (JP)

( * ) Notice: Subject to any disclaimer, the term of this patent is extended or adjusted under 35 U.S.C. 154(b) by 0 days.

(21) Appl. No.: 15/620,042

(22) Filed: Jun. 12, 2017

(65) Prior Publication Data

US 2017/0366102 A1   Dec. 21, 2017

(30) Foreign Application Priority Data

Jun. 15, 2016  (JP) ................................ 2016-119274

(51) Int. Cl.
| | | |
|---|---|---|
| *H02M 7/5387* | (2007.01) | |
| *H02M 3/335* | (2006.01) | |
| *H02M 3/28* | (2006.01) | |
| *H02M 1/10* | (2006.01) | |
| *H02M 1/44* | (2007.01) | |

(Continued)

(52) U.S. Cl.
CPC ........... *H02M 7/5387* (2013.01); *H02M 1/10* (2013.01); *H02M 1/36* (2013.01); *H02M 1/44* (2013.01); *H02M 3/28* (2013.01); *H02M 3/33507* (2013.01); *H02M 3/33569* (2013.01); *H02M 2001/0058* (2013.01)

(58) Field of Classification Search
CPC ........ H02M 1/10; H02M 7/5387; H02M 1/44; H02M 3/28; H02M 3/33569
See application file for complete search history.

(56) References Cited

U.S. PATENT DOCUMENTS

| | | | |
|---|---|---|---|
| 2010/0046262 A1* | 2/2010 | Wu | ........................ H02M 1/083 363/126 |
| 2012/0243269 A1* | 9/2012 | Ren | ................... H02M 3/33507 363/21.12 |

(Continued)

FOREIGN PATENT DOCUMENTS

| | | |
|---|---|---|
| JP | 2008312335 A | 12/2008 |
| JP | 2014079155 A | 5/2014 |

*Primary Examiner* — Adolf Berhane
*Assistant Examiner* — Bart Iliya
(74) *Attorney, Agent, or Firm* — Cantor Colburn LLP

(57) ABSTRACT

An insulated DC/DC converter includes: a transformer; a switching transistor; a rectifier circuit; a photocoupler; a feedback circuit configured to drive a light emitting element of the photocoupler such that an output voltage of the DC/DC converter approaches a target voltage; a primary side controller having a feedback terminal which is connected to a light receiving element of the photocoupler and receives a feedback signal from the photocoupler, a zero current detection terminal which receives a zero current detection signal corresponding to a voltage generated at one end of an auxiliary winding of the transformer, and a pulse modulator of a quasi-resonant mode configured to generate a pulse signal depending on the feedback signal and the zero current detection signal; and a starting control circuit which, in start-up of the DC/DC converter, electrically affects the zero current detection terminal such that an OFF time of the switching transistor lengthens.

21 Claims, 13 Drawing Sheets

(51) Int. Cl.
*H02M 1/36* (2007.01)
*H02M 1/00* (2006.01)

(56) References Cited

U.S. PATENT DOCUMENTS

2014/0152192 A1* 6/2014 Kim .................. H05B 33/0854
   315/283
2014/0160803 A1* 6/2014 Sato .................. H02M 3/33507
   363/21.01
2017/0302185 A1* 10/2017 Tao .................. H02M 3/33592

* cited by examiner

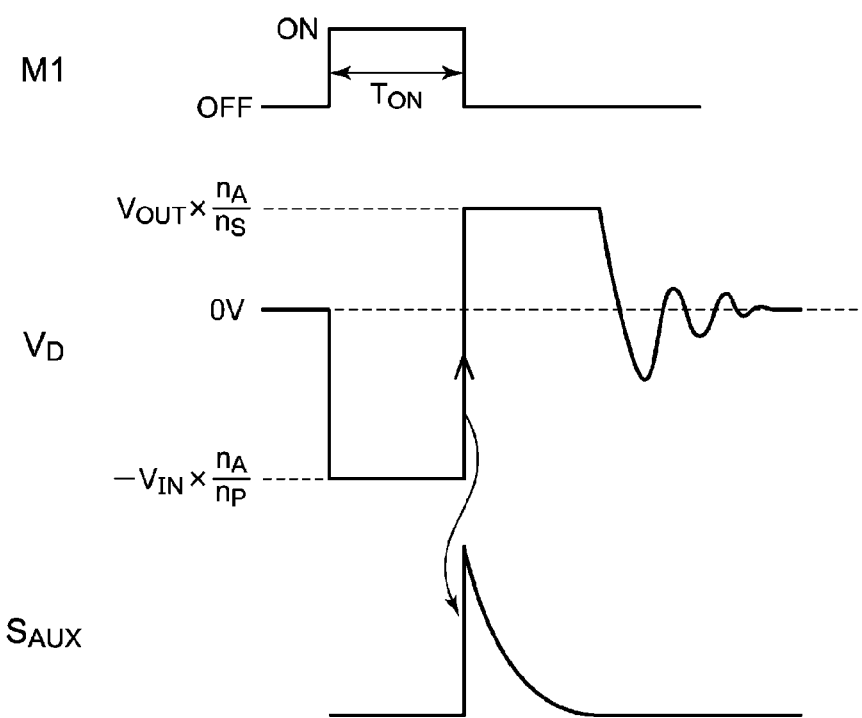

INSULATED DC/DC CONVERTER, AND POWER ADAPTOR AND ELECTRONIC DEVICE USING THE SAME

CROSS-REFERENCE TO RELATED APPLICATION(S)

The present invention claims priority under 35 U.S.C. § 119 to Japanese Patent Application No. 2016-119274, filed on Jun. 15, 2016, the entire contents of which are incorporated herein by reference.

TECHNICAL FIELD

The present disclosure relates to an insulated DC/DC converter.

BACKGROUND

An insulated DC/DC converter, specifically, a flyback type or forward type DC/DC converter is used in various power supply circuits, such as an AC/DC converter. FIG. 1 is a circuit diagram of an AC/DC converter 100r including a synchronous rectification type flyback converter 200r.

The AC/DC converter 100r mainly includes a fuse 102, an input capacitor Ci, a filter 104, a diode rectifier circuit 106, a smoothing capacitor Cs, and the flyback converter 200r.

A commercial AC voltage $V_{AC}$ is input to the filter 104 via the fuse 102 and the input capacitor Ci. The filter 104 removes noise from the commercial AC voltage $V_{AC}$. The diode rectifier circuit 106 is a diode bridge circuit that full-wave rectifies the commercial AC voltage $V_{AC}$. An output voltage from the diode rectifier circuit 106 is smoothed by the smoothing capacitor Cs and converted into a DC voltage $V_{IN}$.

The insulated flyback converter 200r receives the DC voltage $V_{IN}$ at an input terminal P1, steps down the same, and supplies an output voltage $V_{OUT}$ stabilized to a target value to a load (not shown) connected to an output terminal P2.

A switching transistor M1 is connected to a primary winding W1 of a transformer T1, and a synchronous rectifying transistor M2 is connected to a secondary winding W2 thereof. A secondary side controller 400 switches the synchronous rectifying transistor M2 in synchronization with the switching transistor M1.

An output capacitor Co1 is connected to the output terminal P2. A feedback circuit 206 drives a light emitting element of a photocoupler 204 with a current corresponding to an error between the output voltage $V_{OUT}$ and its target voltage $V_{OUT(REF)}$. A feedback current $I_{FB}$ corresponding to the error flows through a light receiving element of the photocoupler 204.

A rectifier diode D2 and a smoothing capacitor Co2 form a power supply circuit 208 together with an auxiliary winding W3 of the transformer T1. A source voltage $V_{CC}$ generated by the power supply circuit 208 is supplied to a power (VCC) terminal of a primary side controller 300r.

The primary side controller 300r is a quasi-resonant controller. A feedback voltage $V_{FB}$ corresponding to the feedback current $I_{FB}$ is generated at a feedback (FB) terminal of the primary side controller 300r. Further, a current detection signal $V_{CS}$ that is proportional to the primary current $I_P$ flowing through the switching transistor M1 is fedback to a current detection (CS) terminal of the primary side controller 300r. For the current detection signal $V_{CS}$, a voltage drop of a sense resistor $R_S$ installed in series with the switching transistor M1 is used. A voltage VD generated at the auxiliary winding W3 is divided by resistors $R_{ZT1}$ and $R_{ZT2}$ and input to a zero current detection (ZT) terminal. A capacitor $C_{ZT}$ is connected to the ZT terminal.

For example, the primary side controller 300r includes a pulse modulator in a peak current mode of a quasi-resonant mode, and generates a pulse signal $S_{OUT}$ having a duty ratio (or a frequency) corresponding to the feedback voltage $V_{FB}$, the current detection signal $V_{CS}$, and a voltage $V_{ZT}$ of the ZT terminal to drive the switching transistor M1 connected to an output (OUT) terminal.

The present inventor has reviewed a starting operation of the DC/DC converter 200r of FIG. 1 and recognized the following technical problem.

The pulse modulator of the quasi-resonant mode is triggered to turn on the switching transistor M1 when it detects that a current $I_S$ of the secondary winding is zero (zero current).

While the switching transistor M1 is off and the current $I_S$ flows though the secondary winding W2, the voltage $V_D$ that is proportional to the output voltage $V_{OUT}$ is generated in the auxiliary winding W3. Further, when the current $I_S$ becomes zero, the voltage $V_D$ of the auxiliary winding W3 greatly swings in a negative direction. Here, the pulse modulator detects the zero current depending on the voltage $V_{ZT}$ of the ZT terminal.

Specifically, after the voltage VZT of the ZT terminal exceeds a first threshold voltage VTH1 (e.g., 0.2V), when it falls below a second threshold voltage VTH2 (e.g., 0.1V) that is lower than the first threshold voltage VTH1, a bottom detection signal is asserted and the switching transistor M1 is turned on using the asserted bottom detection signal as a trigger.

However, since the output voltage $V_{OUT}$ is low immediately after the primary side controller 300r starts up (or when the output is short-circuited), the voltage $V_{ZT}$ of the ZT terminal becomes low. Thus, there arises a situation where the voltage $V_{ZT}$ of the ZT terminal cannot exceed the first threshold voltage 0.2V, which stops switching of the switching transistor M1. In order to solve this problem, when a state in which the voltage $V_{ZT}$ of the ZT terminal is lower than the first threshold voltage $V_{TH1}$ (0.2V) continues for a predetermined period of time ($\tau_1$), the switching transistor M1 is forcibly turned on.

FIG. 2 is an operational waveform diagram when the DC/DC converter 200r of FIG. 1 starts up. A vertical axis and a horizontal axis of a waveform diagram or a time chart referred to herein are properly scaled up and down for easy understanding. Each waveform shown is also simplified, exaggerated, or emphasized for easy understanding.

During an ON time of the switching transistor M1 (a high level of $S_{OUT}$), the current $I_P$ of the primary winding W1 increases. When the switching transistor M1 is turned off, the current $I_S$ flows through the secondary winding W2. In a state in which the output voltage $V_{OUT}$ is low immediately after starting up, an OFF time $T_{OFF}$ becomes equal to a predetermined value $\tau_1$. Further, since the slope of the current $I_S$ during the OFF time $T_{OFF}$ is proportional to the output voltage $V_{OUT}$, the slope is very small immediately after starting up and a decrement of the current $I_S$ per cycle is smaller than an increment of the current $I_P$. As a result, the switching transistor M1 is turned on before a zero current where the current $I_S$ becomes zero.

When this operation is repeated, the DC/DC converter 200r starts in a continuous mode and the current $I_P$ of the primary winding W1 increases. When the DC/DC converter 200r starts in the continuous mode, a very high surge voltage exceeding 100V is generated across (between a drain and a source of) the secondary side synchronous rectifying transistor M2.

SUMMARY

The present disclosure provides some embodiments of a DC/DC converter in which surge noise generated in a secondary side rectifier circuit in a low voltage state is suppressed.

According to one embodiment of the present disclosure, there is provided an insulated DC/DC converter. The insulated DC/DC converter includes: a transformer having a primary winding, a secondary winding, and an auxiliary winding; a switching transistor installed between the primary winding of the transformer and a ground line; a rectifier circuit connected to the secondary winding of the transformer; a photocoupler including a light emitting element and a light receiving element; a feedback circuit configured to drive the light emitting element of the photocoupler such that an output voltage of the DC/DC converter approaches a target voltage; a primary side controller having a feedback terminal which is connected to the light receiving element of the photocoupler and receives a feedback signal from the photocoupler, a zero current detection terminal which receives a zero current detection signal corresponding to a voltage generated at one end of the auxiliary winding, and a pulse modulator of a quasi-resonant mode configured to generate a pulse signal depending on the feedback signal and the zero current detection signal; and a starting control circuit which electrically affects the zero current detection terminal such that an OFF time of the switching transistor lengthens when the DC/DC converter starts up.

According to this embodiment, it is possible to delay a timing at which the pulse signal shifts to an ON level. Thus, it is possible to reduce a residual energy of the transformer at a timing at which the switching transistor is turned on, and to suppress surge noise generated in the secondary side rectifier circuit.

Further, the term "electrically affecting" includes voltage shift, superimposition of voltage, source or sink of current, impedance change, and the like.

The pulse modulator may be configured to (i) shift the pulse signal to an OFF level depending on the feedback signal, and (ii) forcibly shift the pulse signal to an ON level when a state in which the zero current detection signal does not reach a predetermined first threshold voltage continues for a first predetermined time. The starting control circuit may be configured to, in the start-up of the DC/DC converter, superimpose an auxiliary signal on the zero current detection terminal such that a voltage of the zero current detection terminal exceeds the first threshold voltage each time the switching transistor is turned off.

According to this embodiment, it is possible to make the OFF time longer than a first time, and to suppress the surge noise generated in the secondary side rectifier circuit.

The primary side controller may further include: a comparator configured to assert a bottom detection signal when the zero current detection signal exceeds the first threshold voltage and then becomes lower than a second threshold voltage that is lower than the first threshold voltage; and a blanking circuit configured to mask the bottom detection signal for a predetermined mask time after the switching transistor is turned off. The starting control circuit may be configured to superimpose the auxiliary signal on the zero current detection terminal such that a voltage of the zero current detection terminal becomes higher than the first threshold voltage after a lapse of the mask time from turning-off of the switching transistor.

The starting control circuit may be configured to generate the auxiliary signal using a voltage generated at one end of the auxiliary winding. The starting control circuit may be configured to superimpose a high frequency component of a voltage generated at one end of the auxiliary winding on the zero current detection terminal.

The high frequency component of the voltage generated in the auxiliary winding, namely a differential waveform is superimposed on the zero current detection terminal, so that the voltage of the zero current detection terminal exceeds the first threshold voltage.

The starting control circuit may include a first capacitor installed between one end of the auxiliary winding and the zero current detection terminal. Thus, it is possible to extract a spike-like waveform from the voltage generated in the auxiliary winding.

The starting control circuit may include a first resistor installed in series with the first capacitor between the one end of the auxiliary winding and the zero current detection terminal.

It is possible to adjust an amplitude level of the voltage superimposed on the zero current detection terminal by the first resistor. In addition, when the primary side controller includes the blanking circuit, it is possible to optimize a rise speed of the auxiliary signal for the mask time of the blanking circuit by the first resistor and the first capacitor.

According to one embodiment, the starting control circuit may include a high pass filter.

The pulse modulator may be configured to (ii) shift the pulse signal to an ON level when the zero current detection signal reaches a predetermined first threshold voltage and then a state in which the zero current detection signal becomes lower than a predetermined second threshold voltage occurs a predetermined number of times. The starting control circuit may be configured to control an electrical state of the zero current detection terminal such that a base line of the voltage of the zero current detection terminal exceeds the second threshold voltage when the DC/DC converter starts up.

It is possible to shift a base line of the voltage of the ZT terminal to a high potential side by the second resistor. Thus, it becomes possible to, after the spike waveform disappears, maintain the ZT terminal value at a level higher than the second threshold value, and to further prolong the OFF time of the switching transistor.

The DC/DC converter of one embodiment may further include: a power supply circuit including a diode whose anode is connected to the one end of the auxiliary winding and a second capacitor connected to a cathode of the diode, and configured to generate a power supply voltage of the primary side controller. The starting control circuit may be configured to control the base line of the voltage of the zero current detection terminal using the power supply voltage when the DC/DC converter starts up.

The starting control circuit may further include a second resistor installed between one end of the second capacitor and the zero current detection terminal.

Thus, it becomes possible to shift a base line of the voltage of the ZT terminal to a high potential side using the power supply voltage.

The DC/DC converter of one embodiment may further include a sense resistor installed in series with the switching transistor. The primary side controller may further include a current detection terminal which receives a current detection signal corresponding to a voltage drop of the sense resistor.

The pulse modulator may be a peak current mode modulator configured to (i) shift the pulse signal to an OFF level when the current detection signal reaches the feedback signal.

The rectifier circuit may include: a synchronous rectifying transistor; and a synchronous rectification controller configured to drive the synchronous rectifying transistor.

According to another embodiment of the present disclosure, there is provided an insulated DC/DC converter. The insulated DC/DC converter includes: a transformer having a primary winding, a secondary winding, and an auxiliary winding; a switching transistor installed between the primary winding of the transformer and a ground line; a sense resistor installed in series with the switching transistor; a rectifier circuit connected to the secondary winding of the transformer; a photocoupler including a light emitting element and a light receiving element; a feedback circuit configured to drive the light emitting element of the photo coupler such that an output voltage of the DC/DC converter approaches a target voltage; a primary side controller having a feedback terminal which is connected to the light receiving element of the photocoupler and receives a feedback signal from the photocoupler, a current detection terminal which receives a current detection signal corresponding to a voltage drop of the sense resistor, a zero current detection terminal which receives a zero current detection signal corresponding to a voltage generated at one end of the auxiliary winding, and a peak current mode pulse modulator of a quasi-resonant mode configured to generate a pulse signal depending on the feedback signal, the current detection signal, and the zero current detection signal; a first voltage dividing resistor installed between the one end of the auxiliary winding and the current detection terminal; a second voltage dividing resistor installed between the current detection terminal and the ground line; and a first resistor and a first capacitor installed in series and on a path parallel with the first voltage dividing resistor, between the one end of the auxiliary winding and the current detection terminal.

The DC/DC converter may further include: a power supply circuit including a diode whose anode is connected to the one end of the auxiliary winding and a second capacitor connected to a cathode of the diode, and configured to generate a power supply voltage of the primary side controller; and a second resistor installed between one end of the second capacitor and the zero current detection terminal;

According to yet another embodiment of the present disclosure, there is provided an electronic device. The electronic device may include: a load; a diode rectifier circuit configured to full-wave rectify a commercial AC voltage; a smoothing capacitor configured to smooth an output voltage of the diode rectifier circuit to generate a DC input voltage; and the DC/DC converter configured to step down the DC input voltage to supply the stepped down voltage to the load.

According to a further embodiment of the present disclosure, there is provided a power adaptor. The power adaptor may include: a diode rectifier circuit configured to full-wave rectify a commercial AC voltage; a smoothing capacitor configured to smooth an output voltage of the diode rectifier circuit to generate a DC input voltage; and the DC/DC converter configured to step down the DC input voltage to supply the stepped down voltage to the load.

Further, arbitrarily combining the foregoing components or substituting the components or expressions of the present disclosure with one another among a method, an apparatus, and a system is also effective as an embodiment of the present disclosure.

BRIEF DESCRIPTION OF THE DRAWINGS

FIG. 7 is a diagram illustrating an operation of the starting control circuit of FIG. 6.

DETAILED DESCRIPTION

Figure 1:
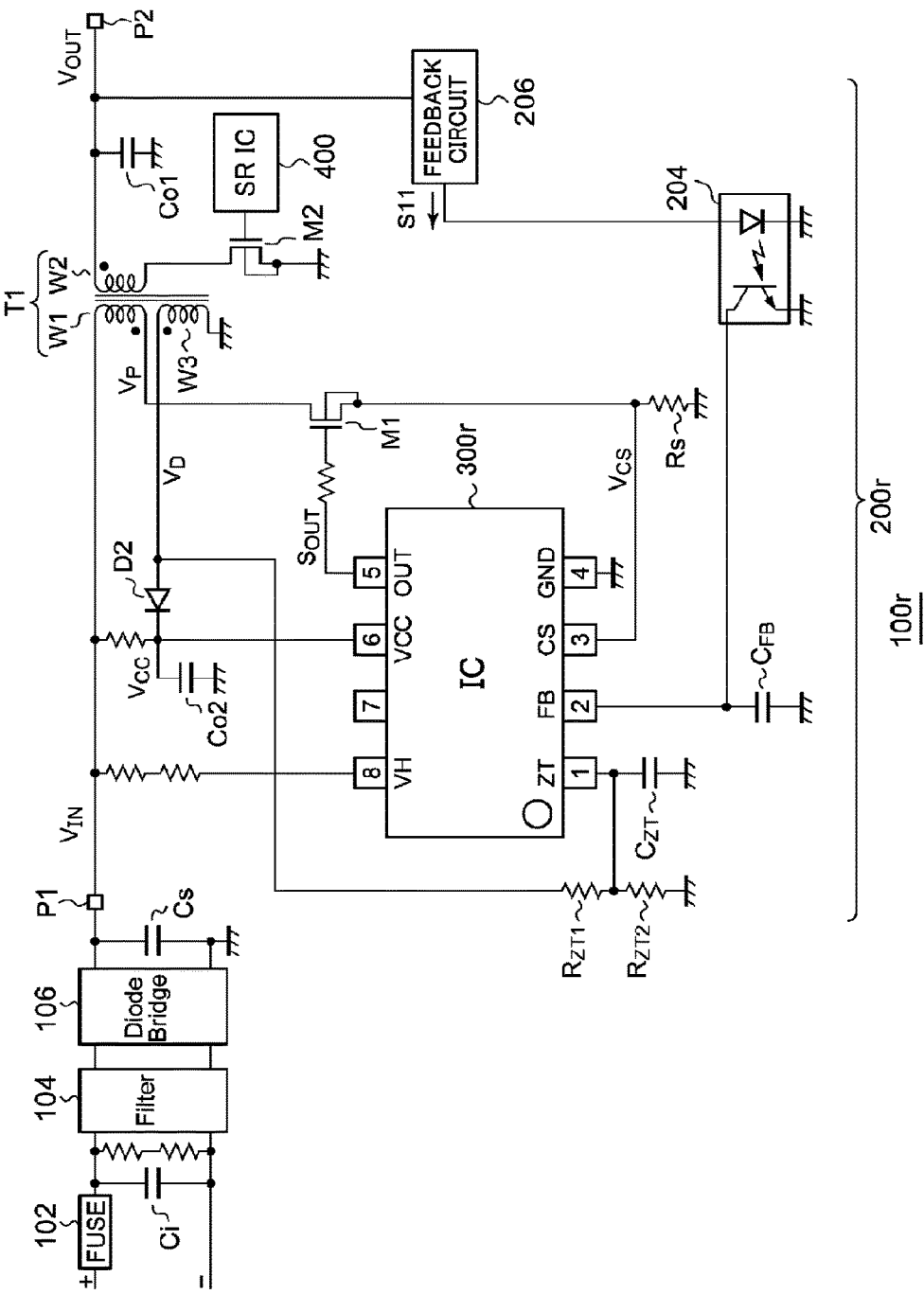
FIG. 1 is a circuit diagram of an AC/DC converter having a synchronous rectification type flyback converter.

Embodiments of the present disclosure will be now described in detail with reference to the drawings. Like or equivalent components, members, and processes illustrated in each drawing are given like reference numerals and a repeated description thereof will be properly omitted. Further, the embodiments are presented by way of example only, and are not intended to limit the present disclosure, and any feature or combination thereof described in the embodiments may not necessarily be essential to the present disclosure.

In the present disclosure, "a state where a member A is connected to a member B" includes a case where the member A and the member B are physically directly connected or even a case where the member A and the member B are indirectly connected through any other member that does not affect an electrical connection state between the members A and B or does not inhibit any function.

Similarly, "a state where a member C is installed between a member A and a member B" includes a case where the member A and the member C or the member B and the member C are indirectly connected through any other member that does not affect an electrical connection state between the members A and C or the members B and C or does not inhibit any function, in addition to a case where the member A and the member C or the member B and the member C are directly connected.

Figure 3:
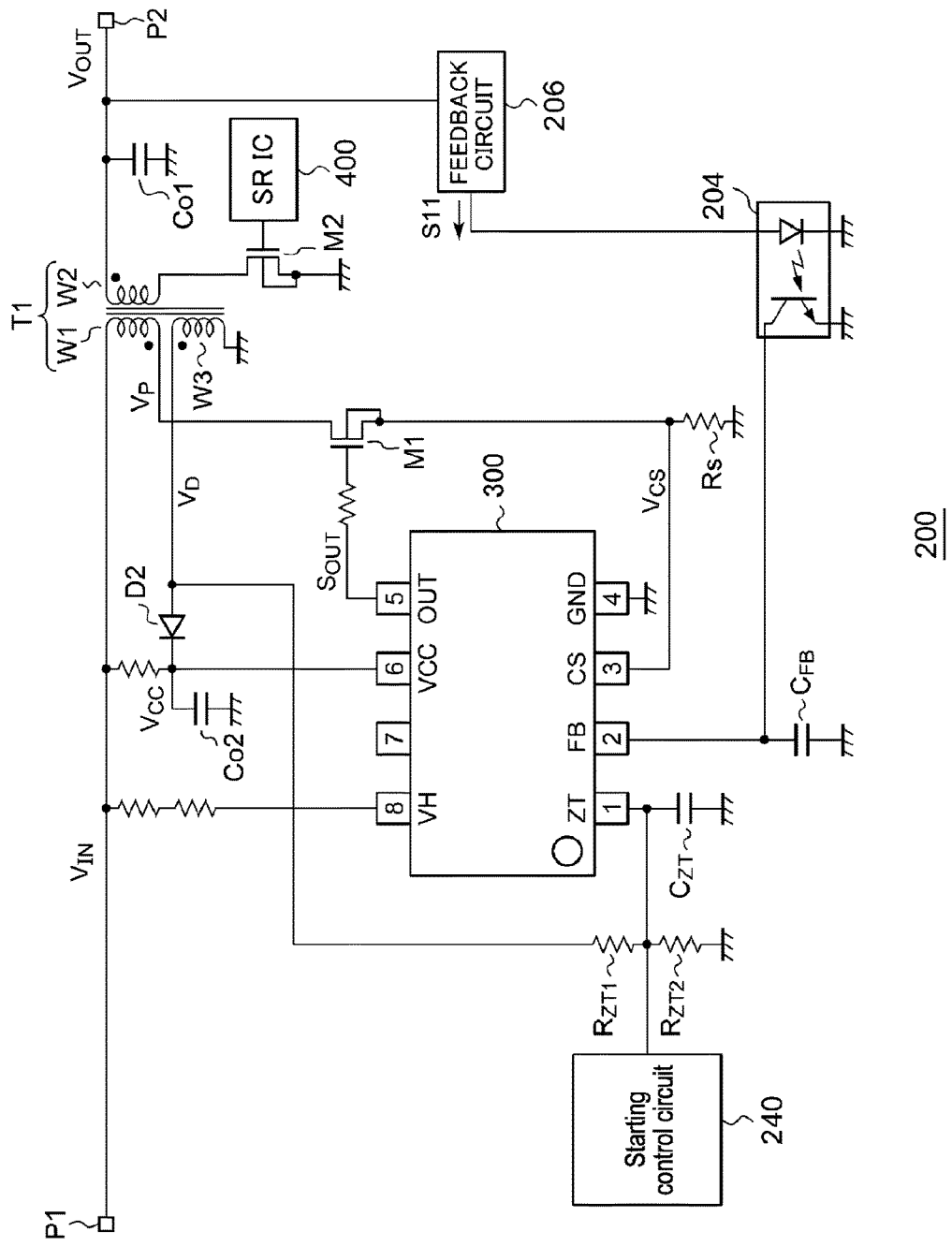
FIG. 3 is a circuit block diagram of a DC/DC converter according to a first embodiment of the present disclosure.

FIG. 3 is a circuit block diagram of a DC/DC converter 200 according to a first embodiment of the present disclosure. The DC/DC converter 200 further includes a starting control circuit 240, in addition to the flyback converter 200r of FIG. 1.

The primary side controller 300 will be described in detail. The FB terminal of the primary side controller 300 is connected to the light receiving element of the photocoupler 204 to receive the feedback signal $V_{FB}$ from the photocoupler 204. A zero current detection signal $V_{ZT}$ corresponding to a voltage $V_D$ generated at one end of the auxiliary winding W3 is input to the ZT terminal of the primary side controller 300. Specifically, the voltage $V_D$ at one end of the auxiliary winding W3 is divided by a first voltage dividing resistor $R_{ZT1}$ and a second voltage dividing resistor $R_{ZT2}$ and input to the ZT terminal. A capacitor $C_{ZT}$ is connected to the ZT terminal.

The primary side controller 300 includes a pulse modulator (not shown) for generating a pulse signal $S_{PFM}$. The pulse modulator operates in a quasi-resonant manner where (i) the pulse signal $S_{PFM}$ shifts to an OFF level depending on the feedback signal $V_{FB}$ and (ii) the pulse signal $S_{PFM}$ shifts to an ON level under a condition of zero cross of a current of the secondary winding W2 detected depending on the zero current detection signal $V_{ZT}$.

In the present disclosure, a specific configuration of the pulse generator operating in the quasi-resonant manner is not particularly limited. Under some conditions, when the zero current detection signal $V_{ZT}$ of the ZT terminal does not meet the zero current, the switching transistor M1 may stop its switching. To solve this problem, in many cases, the primary side controller 300 forcibly turns on the switching transistor M1 to shift the pulse signal $S_{PFM}$ to an ON level, although the zero current detection terminal $V_{ZT}$ does not cross zero, when a predetermined condition is met.

Figure 2:
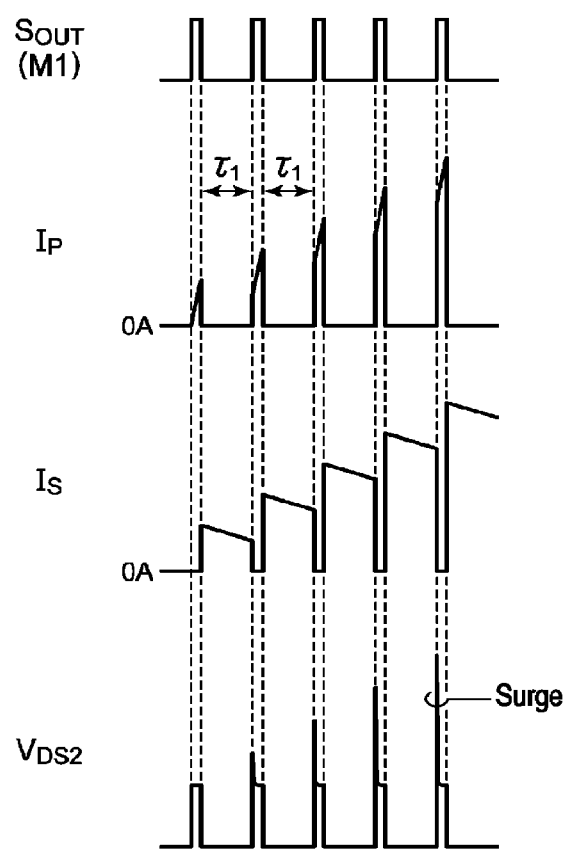
FIG. 2 is an operational waveform diagram when the DC/DC converter of FIG. 1 starts up.

For example, the switching transistor M1 is forcibly turned on after a lapse of a predetermined first time $\tau_1$ from an immediate previous turn-off of the switching transistor M1. As explained above with reference to FIG. 2, when an OFF time of the switching transistor M1 is fixed to the first time $\tau_1$ in the low voltage state, a surge is caused by operations in the continuous current mode.

In order to suppress the surge in the low voltage state, the DC/DC converter 200 includes the starting control circuit 240.

When the DC/DC converter 200 starts up, the starting control circuit 240 electrically affects the ZT terminal such that the OFF time of the switching transistor M1 becomes longer than that occurring when the starting control circuit 240 is not installed (i.e., $\tau_1$).

Figure 4:
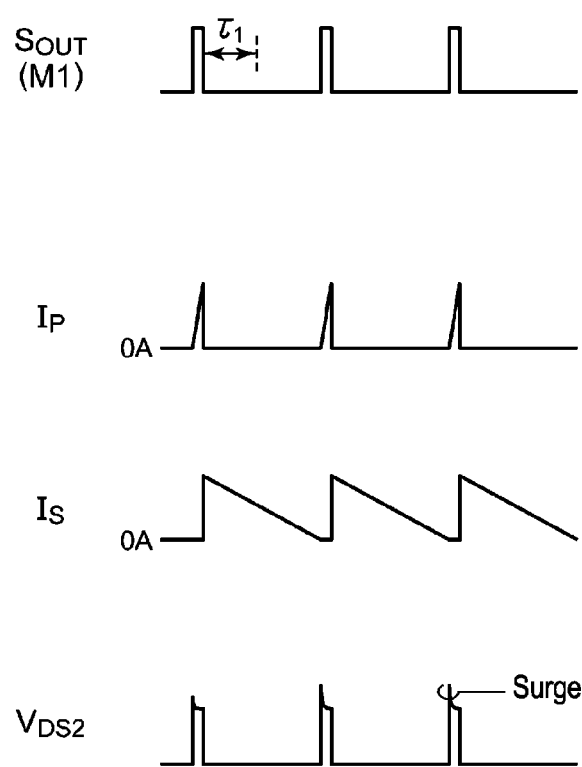
FIG. 4 is an operational waveform diagram when the DC/DC converter of FIG. 3 starts up.

The above is the configuration of the DC/DC converter 200. Next, an operation of the DC/DC converter 200 will be described. FIG. 4 is an operational waveform diagram when the DC/DC converter 200 of FIG. 3 starts up. An OFF time $T_{OFF}$ of the switching transistor M1 becomes longer than the first time $\tau_1$, by the starting control circuit 240. Thus, the DC/DC converter 200 can operate in a discontinuous current mode (or a critical mode). As a result, since the residual energy of the transformer T1 approaches zero at a timing when the switching transistor M1 is turned on, it is possible to suppress the surge generated in the secondary winding W2 due to the turning on of the switching transistor M1.

The above is the operation of the DC/DC converter 200. According to the DC/DC converter 200, it is possible to delay a timing at which the pulse signal $S_{OFF}$ shifts to an ON level. Thus, it is possible to reduce the amount of current flowing through the transformer T1, and to suppress surge noise generated in the secondary side rectifier circuit.

The present disclosure is intended to cover various devices and circuits that are recognized by the block diagram or the circuit diagram of FIG. 3 or derived from the above description, but is not limited to the specific configuration. Hereinafter, a more specific configuration example or an example will be described in order to help understand and clarify the essence of the present disclosure and a circuit operation thereof, rather than to narrow the scope of the present disclosure.

The control of the electrical state of the ZT terminal by the starting control circuit 240 may be determined based on an internal configuration or a modulation scheme of the primary side controller 300 and is not particularly limited. In the following specific example, a configuration of a typical primary side controller 300 and a configuration and an operation of the starting control circuit 240 corresponding thereto will be described.

EXAMPLE

Figure 5:
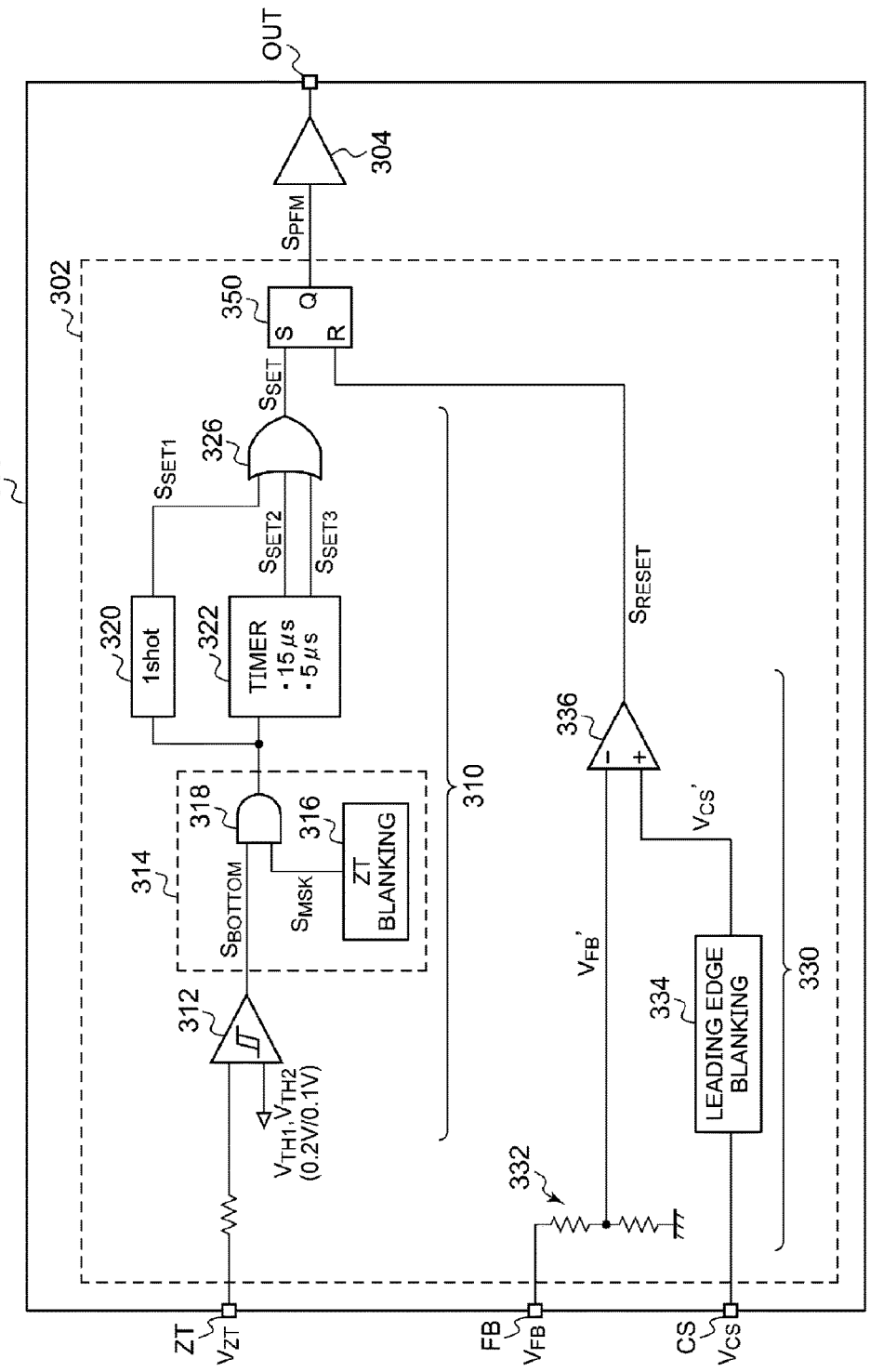
FIG. 5 is a circuit block diagram of a primary side controller according to an example of the present disclosure

FIG. 5 is a circuit block diagram of the primary side controller 300 according to an example of the present disclosure. Further, in FIG. 5, only blocks related to the present disclosure are illustrated and other blocks are properly omitted.

The primary side controller 300 includes a pulse modulator 302 and a driver 304. The pulse modulator 302 generates a pulse signal $S_{PFM}$ in a peak current mode of a quasi-resonant mode. When the zero current detection signal $V_{ZT}$ reaches a predetermined first threshold voltage $V_{TH1}$ (e.g., 0.2V) and then a state (bottom detection) in which the zero current detection signal $V_{ZT}$ becomes lower than a predetermined second threshold voltage $V_{TH2}$ (e.g., 0.1V) occurs a predetermined number of times, the pulse modulator 302 shifts the pulse signal $S_{PFM}$ to an ON level. The predetermined number of times may be one or more times. Further, when the current detection signal $V_{CS}$ reaches the feedback signal $V_{FB}$, the pulse modulator 302 shifts the pulse signal $S_{PFM}$ to an OFF level.

The primary side controller 300 includes a set signal generating part 310, a reset signal generating part 330, and a flipflop 350. The set signal generating part 310 generates a set signal $S_{SET}$ that instructs the switching transistor M1 to be turned on based on a state of the ZT terminal (zero current detection signal $V_{ZT}$).

The reset signal generating part 330 generates a reset signal $S_{RESET}$ that instructs the switching transistor M1 to be turned off based on electrical states ($V_{CS}$ and $V_{FB}$) of the CS terminal and the FB terminal.

The flipflop 350 may be, for example, an SR flipflop, and shifts the pulse signal $S_{PFM}$ as its output to an ON level (e.g., high level) in response to assertion of the set signal $S_{SET}$, and shifts the pulse signal $S_{PFM}$ to an OFF level (low level) in response to assertion of the reset signal $S_{RESET}$.

When the set signal generating part 310 detects that the current $I_S$ of the secondary winding W2 (i.e., the residual energy of the transformer T1) is zero depending on the zero current detection signal $V_{ZT}$ during general operations, the set signal generating part 310 asserts the set signal $S_{SET}$.

The set signal generating part 310 includes a ZT comparator 312, a ZT blanking circuit 314, a one shot circuit 320, a timer circuit 322, and an OR gate 326.

The ZT comparator 312 is a hysteresis comparator, and compares the zero current detection signal $V_{ZT}$ with a threshold voltage to output a bottom detection signal $S_{BOTTOM}$ indicating a comparison result. The threshold voltage switches two values of the first threshold voltage $V_{TH1}$ (e.g., 0.2V) and the second threshold voltage $V_{TH2}$ (e.g., 0.1V) depending on a level of the bottom detection signal $S_{BOTTOM}$.

When the current $I_S$ of the secondary winding W2 becomes zero (zero current), the zero current detection signal $V_{ZT}$ greatly oscillates. At this time, the zero current detection signal $V_{ZT}$ temporarily exceeds the first threshold voltage $V_{TH1}$ and then becomes lower than the second threshold voltage $V_{TH2}$, so that the bottom detection signal $S_{BOTTOM}$ changes in a pulse form (asserted).

Immediately after the switching transistor M1 is turned off, there is a possibility that noise is superimposed on the zero current detection signal $V_{ZT}$ to erroneously detect the zero cross. The ZT blanking circuit 314 is installed to remove the noise. The blanking timer 316 generates a mask signal $S_{MSK}$ which has a low level for a predetermined mask time from the turning off of the switching transistor M1 and then has a high level. The AND gate 318 outputs a logical product of the bottom detection signal $S_{BOTTOM}$ and the mask signal $S_{MSK}$.

The one shot circuit 320 generates a set signal $S_{SET1}$ in response to an edge of the bottom detection signal $S_{BOTTOM}$ which has passed through the ZT blanking circuit 314. The set signal $S_{SET1}$ is input to the flipflop 350 via the OR gate 326.

Further, a counter for counting the bottom detection signal $S_{BOTTOM}$ may be installed when as a condition for turning on the switching transistor a bottom detection is made multiple times.

The pulse modulator 302 has a function of preventing the switching of the switching transistor M1 from being stopped in a situation where the zero cross of the current $I_S$ of the secondary winding W2 cannot be detected by the ZT comparator 312. Specifically, when a state in which the zero current detection signal $V_{ZT}$ does not reach the first threshold voltage $V_{TH1}$ continues for a predetermined first time $\tau_1$ after the switching transistor M1 is turned off, the set signal generating part 310 asserts the set signal $S_{SET}$ to forcibly shift the pulse signal $S_{PFM}$ to an ON level.

For this function, the timer circuit 322 is installed. The timer circuit 322 includes two timers. A first timer measures a time during which the bottom detection signal $S_{BOTTOM}$ has not been generated after the switching transistor M1 is turned off. When the measured time reaches the first time $\tau_1$ (e.g., 15 µs) (timeout), the first timer asserts a set signal $S_{SET2}$.

Further, if the zero current detection signal $V_{ZT}$ of the ZT terminal exceeds the first threshold voltage $V_{TH1}$ and then remains higher than the second threshold voltage $V_{TH2}$, the bottom detection signal $S_{BOTTOM}$ is not asserted, which stops switching of the switching transistor M1. In order to prevent this, the timer circuit 322 includes a second timer. When the bottom detection signal $S_{BOTTOM}$ shifts to a high level and remains at the high level for a second time $\tau_2$ (e.g., 5 µs), the second timer asserts a set signal $S_{SET3}$. Thus, the pulse signal $S_{PFM}$ forcibly shifts to an ON level.

The reset signal generating part 330 will be described. The reset signal generating part 330 includes a voltage dividing circuit 332, a leading edge blanking circuit 334, and a comparator 336.

Immediately after the switching transistor M1 is turned on, noise is superimposed on the current detection signal $V_{CS}$. The leading edge blanking circuit 334 is installed to remove the noise. The leading edge blanking circuit 334 masks the current detection signal $V_{CS}$ for a predetermined mask time from the turning on of the switching transistor M1.

The voltage dividing circuit 332 divides a voltage of the FB terminal to generate a feedback signal $V_{FB}'$. The comparator 336 compares a current detection signal $V_{CS}'$ which has passed through the leading edge blanking circuit 334 with the feedback signal $V_{FB}'$. When the current detection signal $V_{CS}'$ reaches the feedback signal $V_{FB}'$, the comparator 336 asserts the reset signal $S_{RESET}$.

The above is the configuration example of the primary side controller 300. Next, the starting control circuit 240 suitable for the primary side controller 300 of FIG. 5 will be described.

Figure 6:
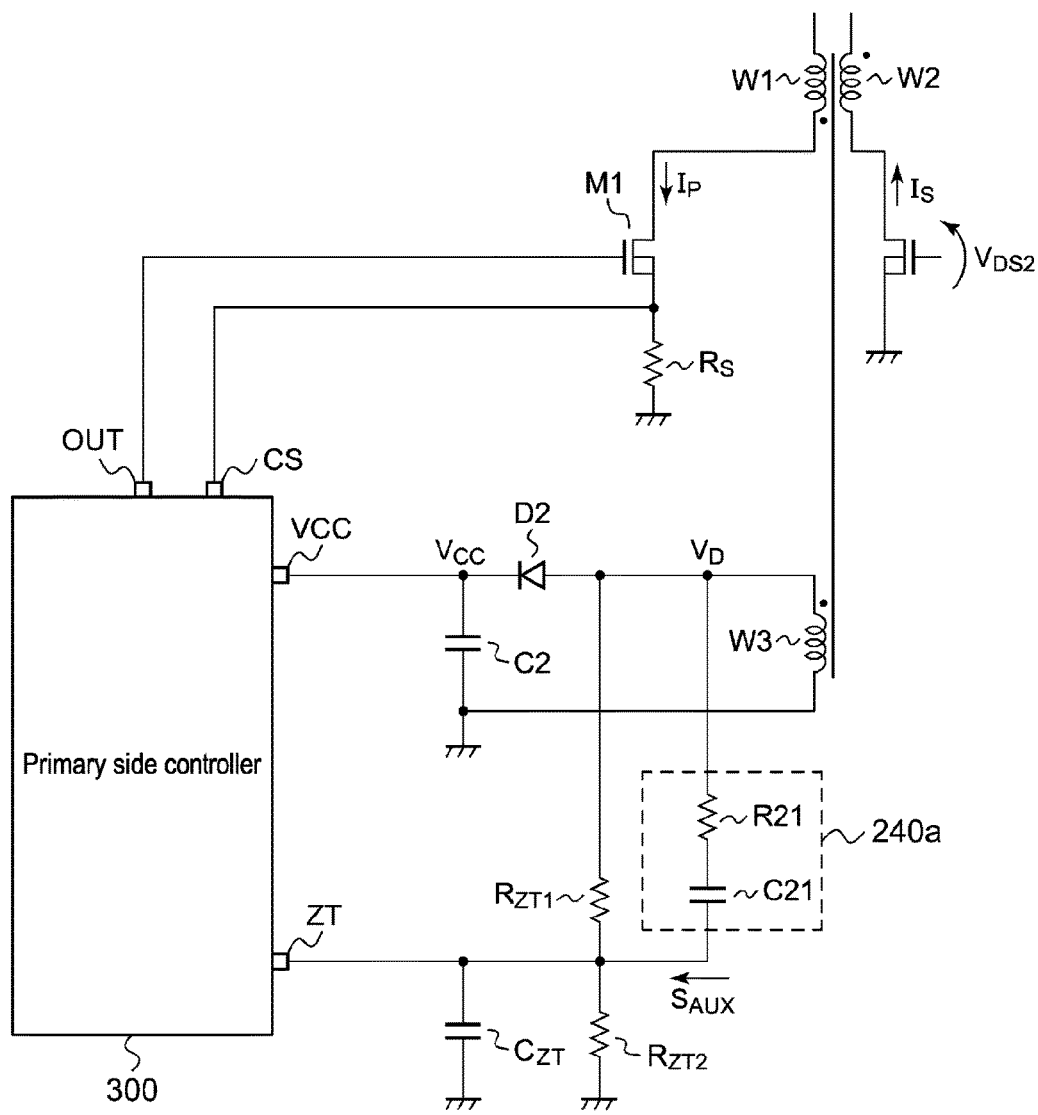
FIG. 6 is a circuit diagram illustrating a first configuration example of a starting control circuit for controlling start-up of the primary side controller of FIG. 5.

FIG. 6 is a circuit diagram illustrating a first configuration example 240a of the starting control circuit 240 of controlling starting of the primary side controller 300 of FIG. 5.

When the DC/DC converter 200 starts up, the starting control circuit 240a superimposes an auxiliary signal $S_{AUX}$ on the ZT terminal such that the voltage of the ZT terminal exceeds the first threshold voltage $V_{TH1}$ each time the switching transistor M1 is turned off. The auxiliary signal $S_{AUX}$ may be a voltage signal or a current signal. This makes it possible to prevent the switching transistor M1 from being forcibly turned on after the lapse of the first time $\tau_1$ (15 µs) from the turning off of the switching transistor M1, and to prolong an OFF time.

More specifically, the starting control circuit 240a generates the auxiliary signal $S_{AUX}$ such that the zero current detection signal $V_{ZT}$ becomes higher than the first threshold voltage $V_{TH1}$ after the lapse of the mask time $T_{MSK}$ from turning off of the switching transistor M1. This makes it possible to prevent a change in the bottom detection signal $S_{BOTTOM}$ caused by the auxiliary signal $S_{AUX}$ from being masked by the ZT blanking circuit 314. There is a requirement that auxiliary signal $S_{AUX}$ cannot interfere with the zero current detection and is thus preferably attenuated before the zero current ($I_S$=0)

The starting control circuit 240a generates the auxiliary signal $S_{AUX}$ using a voltage VD generated at one end of the auxiliary winding W3. Specifically, the starting control circuit 240a may generate the auxiliary signal $S_{AUX}$ using a steep waveform generated in the voltage VD at one end of the auxiliary winding W3, i.e., a high frequency component of the voltage VD, due to the turning off of the switching transistor M1. For example, the starting control circuit 240a may include a high pass filter.

Here, since a spike-like waveform generated in the voltage $V_D$ is generated only for a very short time, if it is superimposed on the ZT terminal as it is, it may be often masked by the ZT blanking circuit 314. In this case, the starting control circuit 240a properly waveform-shapes the high frequency component of the voltage VD to generate the auxiliary signal $S_{AUX}$.

The starting control circuit 240a includes a first capacitor C21 installed between one end of the auxiliary winding W3 and the ZT terminal. The high frequency component of the voltage $V_D$ may be extracted by the first capacitor C21. In addition, a first resistor R21 is installed in series with the first capacitor C21. The first resistor R21 provides a degree of freedom of adjusting a voltage variation of the ZT terminal provided by the auxiliary signal $S_{AUX}$. The first resistor R21 and the first capacitor C21 may be recognized as a high pass filter.

FIG. 7 is a diagram illustrating an operation of the starting control circuit 240a of FIG. 6. A voltage obtained by multiplying the input voltage $V_{IN}$ by a winding ratio $n_A/n_P$ is generated between both ends of the auxiliary winding W3 during an ON time $T_{ON}$ of the switching transistor M1, and thus, the voltage $V_D$ at one end of the auxiliary winding W3 becomes $-V_{IN} \times n_A/n_P$. $n_A$ is the number of turns of the auxiliary winding W3 and $n_P$ is the number of turns of the primary winding W1. While the switching transistor M1 is turned off and the current $I_S$ flows through the secondary winding W2, the voltage VD becomes a positive voltage that is proportional to the output voltage $V_{OUT}$. Thus, the voltage VD steeply changes from negative to positive in response to the turning off of the switching transistor M1. By extracting this steep change by the high pass filter or the like, it is possible to generate the auxiliary signal $S_{AUX}$.

Next, an operation of the DC/DC converter 200 of FIG. 6 will be described.

Figure 8A:
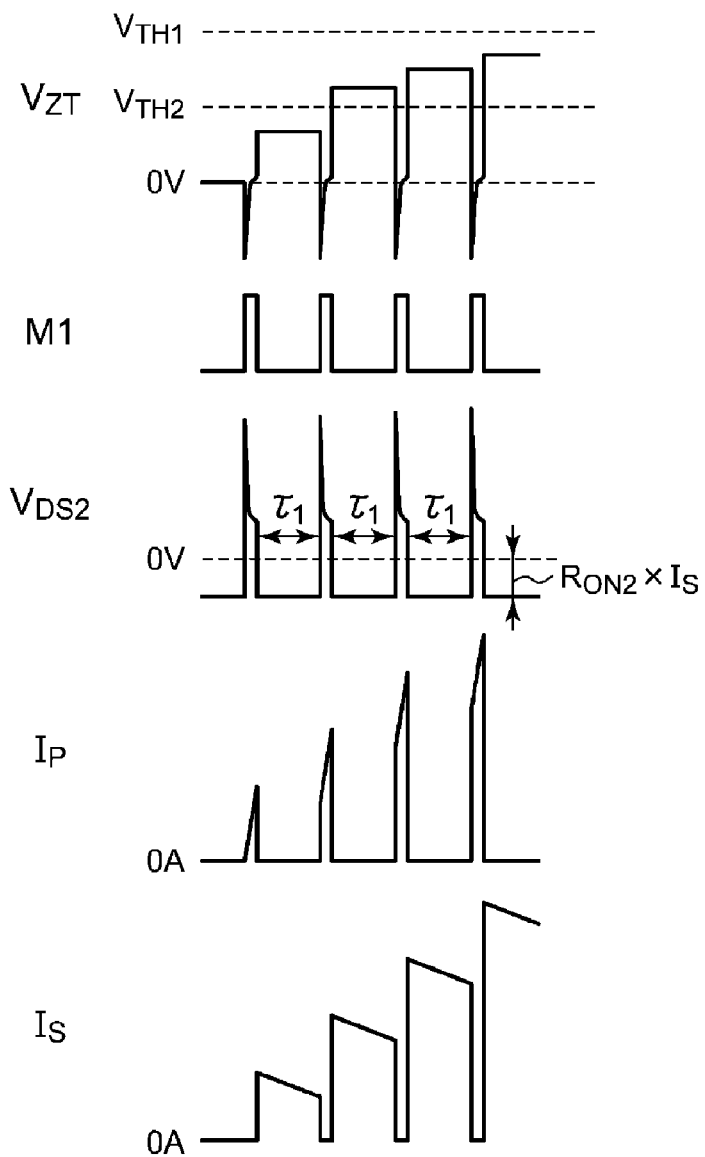
FIG. 8A is an operational waveform diagram of a conventional DC/DC converter and FIG. 8B is an operational waveform diagram of the DC/DC converter of FIG. 6.

In order to further clarify effects obtained by the DC/DC converter 200 of FIG. 6, first, an operation of the conventional DC/DC converter will be described. FIG. 8A is an operational waveform diagram of the conventional DC/DC converter. While a current flows through the secondary winding W2, the zero current detection signal $V_{ZT}$ appears as a voltage obtained by multiplying the output voltage $V_{OUT}$ by the winding ratio $n_P/n_S$. $n_P$ is the number of turns of the primary winding W1 and $n_S$ is the number of turns of the secondary winding W2. Immediately after starting-up, since the output voltage your is low, the zero current detection signal $V_{ZT}$ becomes lower than the first threshold voltage $V_{TH1}$. In the conventional DC/DC converter, a valid bottom detection signal $S_{BOTTOM}$ immediately after starting-up is not generated, and after a predetermined first time $\tau_1$ has lapsed since the switching transistor M1 is turned off, the set signal $S_{SET2}$ is asserted and the pulse signal $S_{PFM}$ forcibly shifts to an ON level.

In this case, since the switching transistor M1 is turned on before the current $I_S$ flowing through the secondary winding W2 drops to zero, the continuous current mode is entered. When the switching transistor M1 is turned on in a state where energy remains in the transformer, a large surge noise occurs between a drain and a source of the synchronous rectifying transistor M2.

It is not desirable that a negative overvoltage is input to the ZT terminal due to the turning on of the switching transistor M1. Thus, although not shown in FIG. 5, a switch is installed between the ZT terminal and a ground, and when the ZT terminal has a negative voltage, the switch may be turned on to fix the ZT terminal to 0V.

Figure 8B:
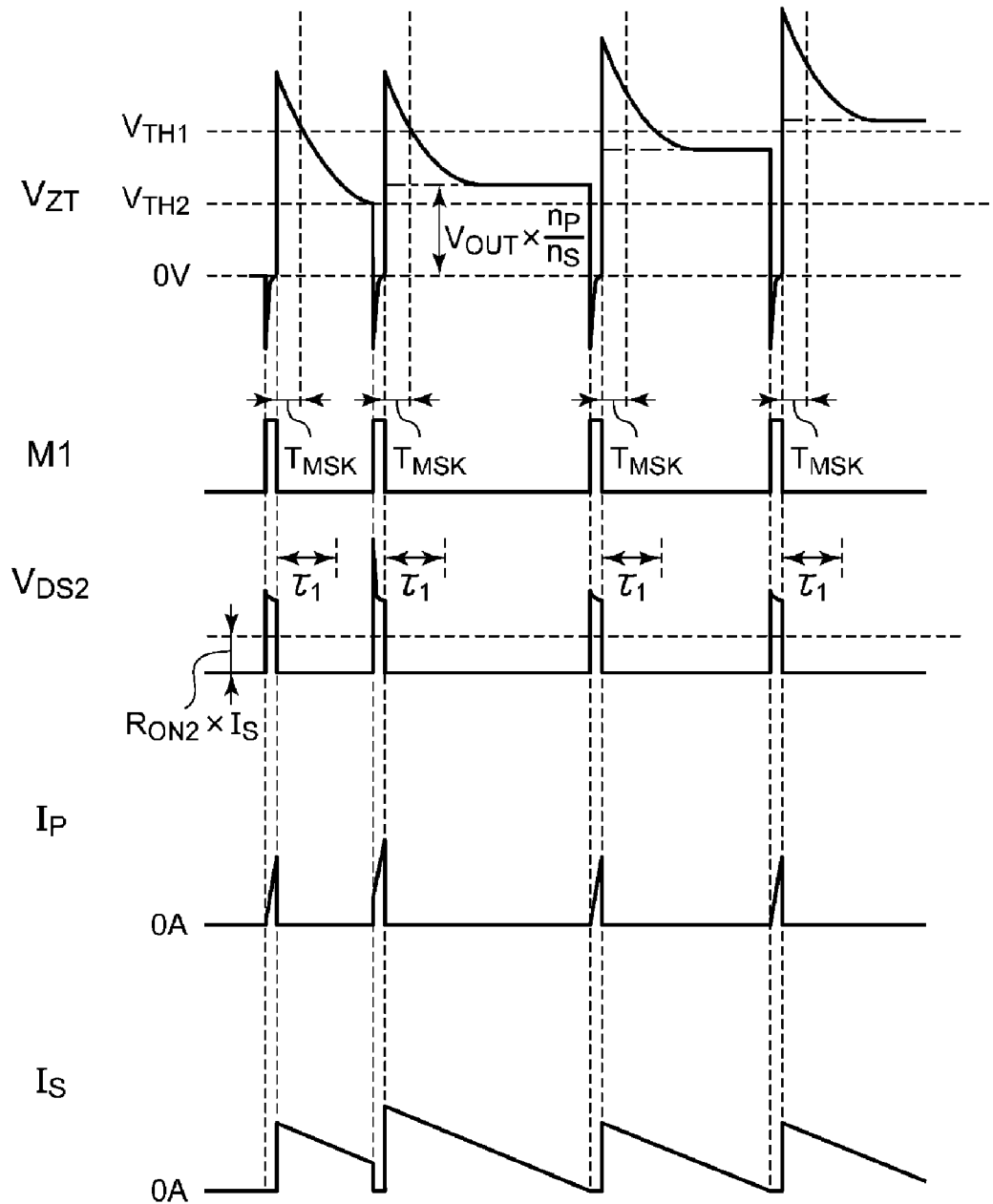

Next, an operation of the DC/DC converter 200 of FIG. 6 will be described with reference to FIG. 8B. FIG. 8B is an operational waveform diagram of the DC/DC converter 200 of FIG. 6. The auxiliary signal $S_{AUX}$ is superimposed on the ZT terminal by the starting control circuit 240a. Thus, the zero current detection signal $V_{ZT}$ becomes higher than a voltage level $V_{OUT} \times n_P/n_S$ that is proportional to the output voltage $V_{OUT}$, to exceed the first threshold voltage $V_{TH1}$.

When the zero current detection signal $V_{ZT}$ exceeds the first threshold voltage $V_{TH1}$, the set signal $S_{SET2}$ is not generated. Therefore, the forcible OFF of the switching transistor M1 by the timer circuit 322 (first timer) is invalidated. Thus, it is possible to make an OFF time longer than the first time $\tau_1$. As the OFF time lengthens, a decrement of the current $I_S$ of the secondary winding W2 increases and the residual energy of the transformer at a timing at which the switching transistor M1 is turned on can be reduced to suppress the secondary side surge noise.

In particular, after a second cycle of FIG. 8B, when the current $I_S$ of the secondary winding W2 becomes zero after the component of the auxiliary signal $V_{AUX}$ is attenuated, the voltage $V_{ZT}$ becomes lower than the second threshold voltage $V_{TH2}$. As a result, a valid bottom detection signal $S_{BOTTOM}$ is generated to turn on the switching transistor M1. That is, an operation of a critical mode can be obtained.

Further, in a first cycle of FIG. 8B, since the output voltage $V_{OUT}$ is low, $V_{OUT} \times n_P \times n_S$ is lower than the second threshold voltage $V_{TH2}$. Thus, when the auxiliary signal $S_{AUX}$ is attenuated, $V_{ZT}$ is less than $V_{TH2}$ ($V_{ZT} < V_{TH2}$), and the bottom detection signal $S_{BOTTOM}$ is asserted before the zero cross to turn on the switching transistor M1.

After the second cycle, since the output voltage $V_{OUT}$ increases, $V_{OUT} \times n_P \times n_S$ becomes higher than the second threshold voltage $V_{TH2}$. The current $I_S$ of the secondary winding becomes zero and the zero current detection signal $V_{ZT}$ swings in a negative direction so that the bottom detection signal $S_{BOTTOM}$ is generated to turn on the switching transistor M1. Thus, after the second cycle, the residual energy of the transformer becomes zero when the switching transistor M1 is turned on, and the secondary side surge noise is reduced.

As in the first cycle, after the zero current detection signal $V_{ZT}$ exceeds the first threshold voltage $V_{TH1}$, when the zero current detection signal $V_{ZT}$ becomes lower than the second threshold voltage $V_{TH2}$ due to attenuation of the auxiliary signal $S_{AUX}$, bottom detection is performed by the ZT comparator 312 to cause the pulse signal $S_{PFM}$ to shift to a high level. If an OFF time at this time is too short, the secondary side surge noise NS generated in a next cycle may not be sufficiently suppressed. Here, a method for solving this problem will be described with a second configuration example.

Figure 9:
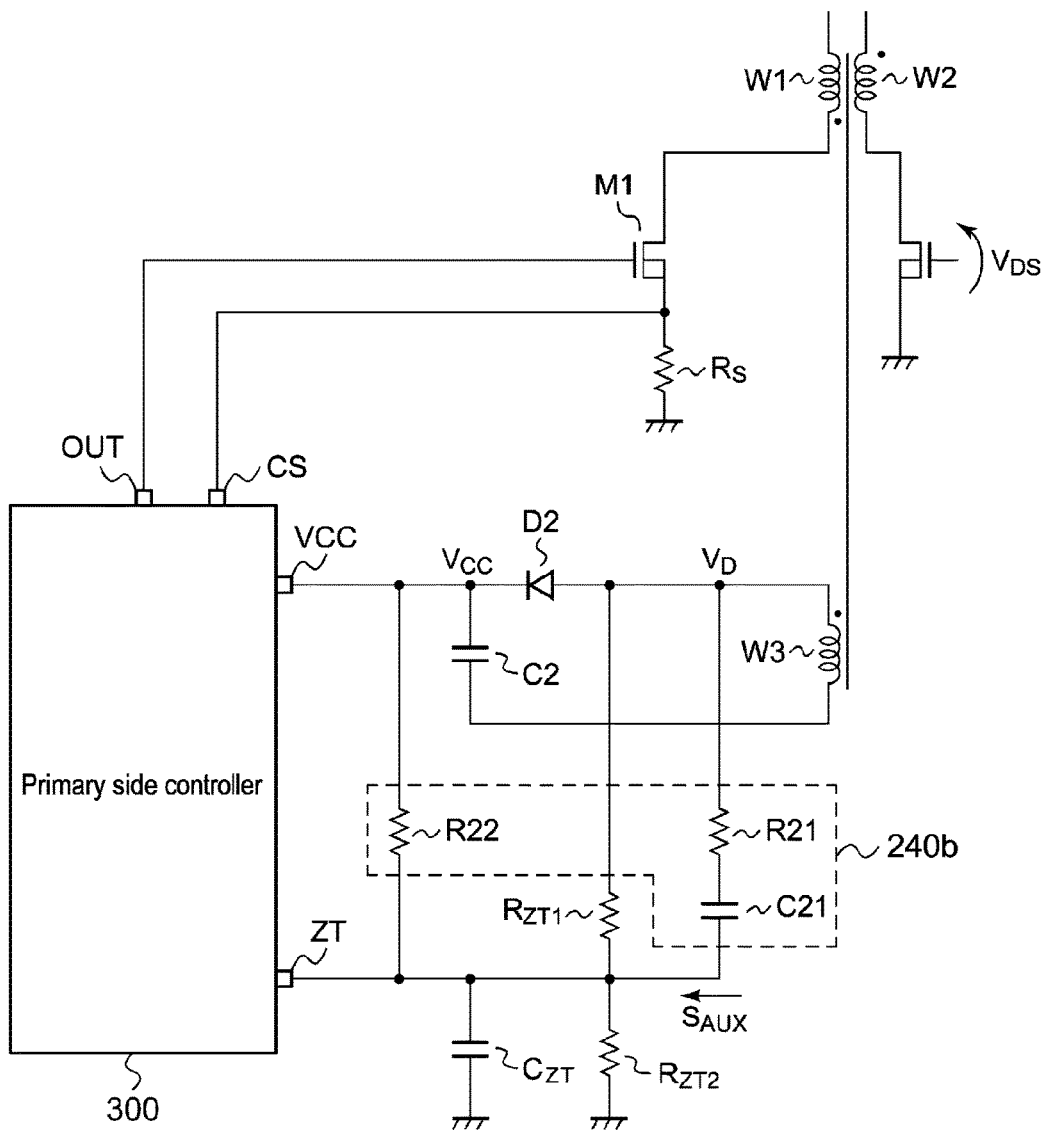
FIG. 9 is a circuit diagram illustrating a second configuration example of the starting control circuit for controlling start-up of the primary side controller of FIG. 5.

FIG. 9 is a circuit diagram illustrating a second configuration example 240b of the starting control circuit 240 controlling the start of the primary side controller 300 of FIG. 5. The starting control circuit 240b controls an electrical state of the ZT terminal such that a base line (bottom line) of the zero current detection signal $V_{ZT}$ exceeds the second threshold voltage $V_{TH2}$ when the DC/DC converter 200 starts up.

The starting control circuit 240b of FIG. 9 controls a base line of the zero current detection signal $V_{ZT}$ using the power supply voltage $V_{CC}$. The starting control circuit 240b further includes a second resistor R22 installed between the smoothing capacitor C2 and the ZT terminal, in addition to the starting control circuit 240a of FIG. 6. Thus, an initial offset $V_{OFS}$ of $V_{CC} \times R_{ZT2}/(R_{ZT2}+R22)$ can be given to the zero current detection signal $V_{ZT}$.

Figure 10:
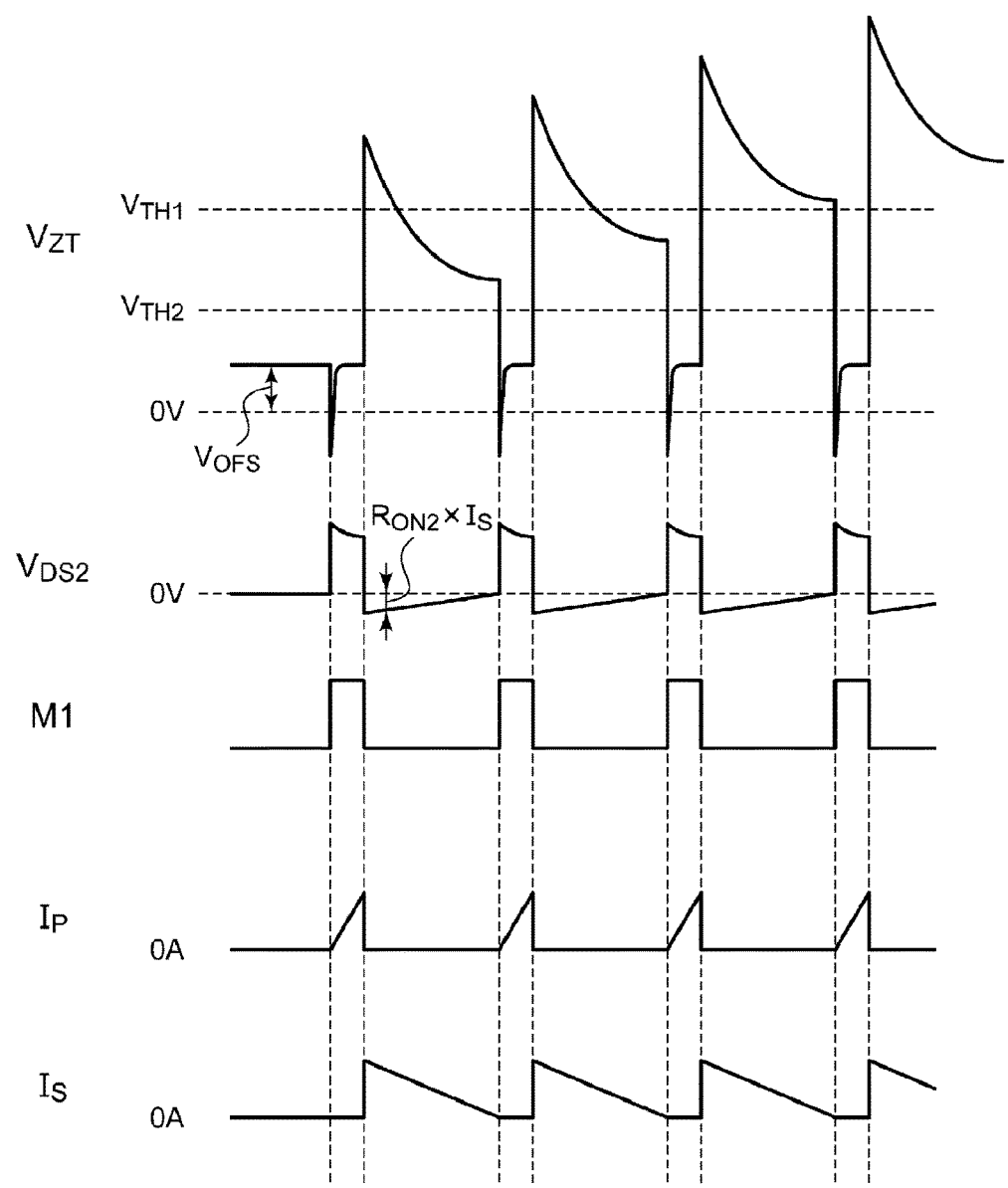
FIG. 10 is an operational waveform diagram of the DC/DC converter of FIG. 9.

FIG. 10 is an operational waveform diagram of the DC/DC converter 200 of FIG. 9. The initial offset $V_{OFS}$ (e.g., 60 mV) is given to the zero current detection signal $V_{ZT}$. Therefore, an attenuation time until the zero current detection signal $V_{ZT}$ is lower than the second threshold voltage $V_{TH2}$ can be prolonged, compared with the case illustrated in FIG. 8B. Thus, it is possible to further lengthen an OFF time of the switching transistor M1 and to further reduce the secondary side surge noise.

Further, in FIG. 10, before the zero current detection signal $V_{ZT}$ superimposed on the auxiliary signal $S_{AUX}$ is attenuated to the second voltage $VTH_2$ in the first cycle, the current of the secondary winding W2 becomes zero, so that the zero current detection signal $V_{ZT}$ swings in a negative direction.

The present disclosure has been described above based on the embodiments. It is to be understood by those skilled in the art that the embodiments are merely illustrative and may be differently modified by any combination of the components or processes, and the modifications are also within the scope of the present disclosure. Hereinafter, these modifications will be described.

(First Modification)

Referring to FIG. 5, when the timer circuit 322 does not have a 15 μs time out function, the resistor R21 and the capacitor C21 of the starting control circuit 240b of FIG. 9 may be omitted and the starting control circuit 240b may be configured with only the resistor R22.

(Second Modification)

A specific configuration of the starting control circuit 240 is not particularly limited. For example, the starting control circuit 240a of FIG. 6 may be configured as a current source of injecting (sourcing) a current pulse to the ZT terminal in response to turning off of the switching transistor M1.

In FIG. 9, the voltage of the ZT terminal is shifted using the power supply voltage $V_{CC}$ generated by the power supply circuit, but the present disclosure is not limited thereto. For example, instead of the power supply voltage $V_{CC}$, the input voltage $V_{IN}$ of the DC/DC converter 200, or a DC voltage generated by any other power supply circuit may be used.

(Third Modification)

The internal configuration of the primary side controller 300 is not particularly limited. For the primary side controller 300, numerous circuits are provided by various venders and a bottom detection scheme of the ZT terminal is diverse. The starting control circuit 240 may be designed, in consideration of the internal configuration or the control scheme of the primary side controller 300, such that a time after turning off of the switching transistor M1 at its starting-up becomes longer.

(Fourth Modification)

In the embodiments, the synchronous rectification type DC/DC converter has been described, but the present disclosure is also applicable to a diode rectifier type DC/DC converter.

(Applications)

Finally, applications of the DC/DC converter 200 will be described. The DC/DC converter 200 can be used for the AC/DC converter 100 suitably used for a power supply block of an AC adapter or an electronic device.

Figure 11:
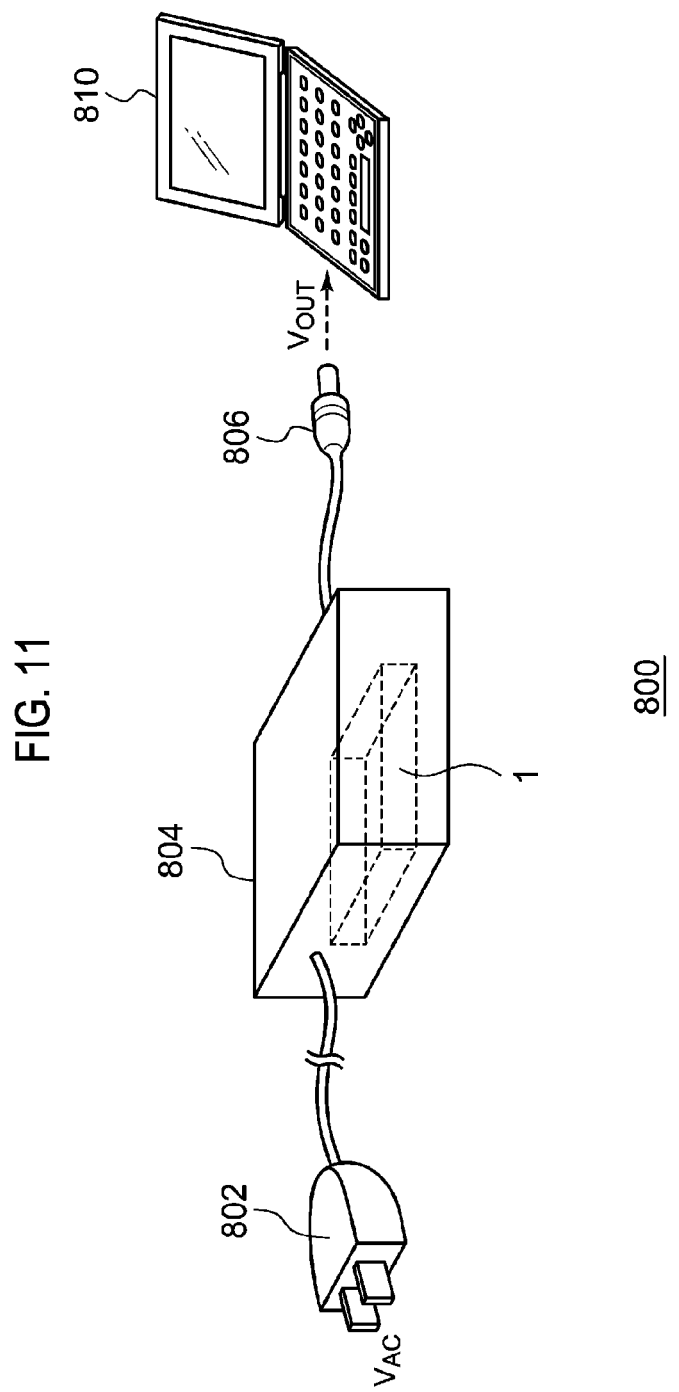
FIG. 11 is a diagram illustrating an AC adapter having an AC/DC converter.

FIG. 11 is a diagram illustrating an AC adapter 800 having the AC/DC converter 100. The AC adapter 800 includes a plug 802, a housing 804, and a connector 806. The plug 802 receives a commercial AC voltage $V_{AC}$ from an outlet (not shown). The AC/DC converter 100 is mounted in the housing 804. A DC output voltage $V_{OUT}$ generated by the AC/DC converter 100 is supplied from the connector 806 to the electronic device 810. Examples of the electronic device 810 include a laptop computer, a digital camera, a digital video camera, a mobile phone, a portable audio player, and the like.

Figure 12A:
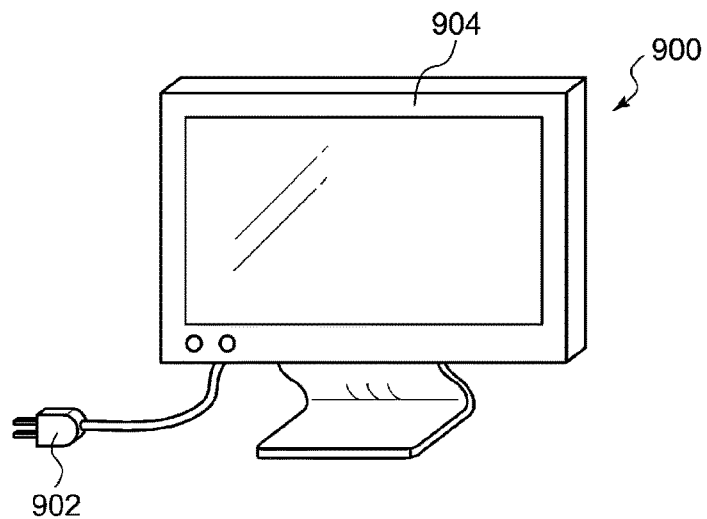
FIGS. 12A and 12B are diagrams illustrating an electronic device having an AC/DC converter.
Figure 12B:
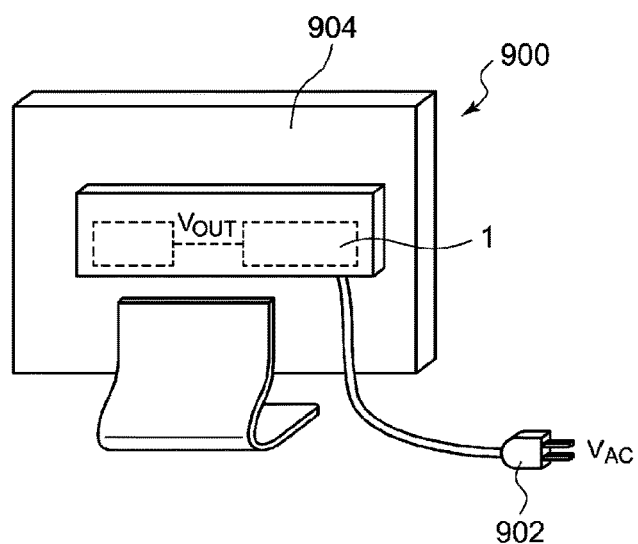

FIGS. 12A and 12B are diagrams illustrating an electronic device 900 having the AC/DC converter 100. The electronic device 900 in FIGS. 12A and 12B is a display device, but the type of the electronic device 900 is not particularly limited thereto, and it may be a device, which incorporates a power supply device, such as an audio device, a refrigerator, a washing machine, a vacuum cleaner, and the like.

The plug 902 receives a commercial AC voltage $V_{AC}$ from an outlet (not shown). The AC/DC converter 100 is mounted in a housing 904. A DC output voltage $V_{OUT}$ generated by the AC/DC converter 100 is supplied to a load, which is mounted in the same housing 904, such as a microcomputer, a digital signal processor (DSP), a power supply circuit, a lighting device, an analog circuit, a digital circuit, or the like.

According to the present disclosure in some embodiments, it is possible to suppress surge noise generated in a secondary side rectifier circuit at the time of starting.

While certain embodiments have been described, these embodiments have been presented by way of example only, and are not intended to limit the scope of the disclosures. Indeed, the novel methods and apparatuses described herein may be embodied in a variety of other forms; furthermore, various omissions, substitutions and changes in the form of the embodiments described herein may be made without departing from the spirit of the disclosures. The accompanying claims and their equivalents are intended to cover such forms or modifications as would fall within the scope and spirit of the disclosures.

What is claimed is:

1. An insulated DC/DC converter, comprising:
a transformer having a primary winding, a secondary winding, and an auxiliary winding;
a switching transistor installed between the primary winding of the transformer and a ground line;
a rectifier circuit connected to the secondary winding of the transformer;
a photocoupler including a light emitting element and a light receiving element;
a feedback circuit configured to drive the light emitting element of the photocoupler such that an output voltage of the DC/DC converter approaches a target voltage;
a primary side controller having a feedback terminal which is connected to the light receiving element of the photocoupler and receives a feedback signal from the photocoupler, a zero current detection terminal which receives a zero current detection signal corresponding to a voltage generated at one end of the auxiliary winding, and a pulse modulator of a quasi-resonant mode configured to generate a pulse signal depending on the feedback signal and the zero current detection signal; and
a starting control circuit which, in start-up of the DC/DC converter, electrically affects the zero current detection terminal such that an OFF time of the switching transistor lengthens, and includes:
a first capacitor installed between the one end of the auxiliary winding and the zero current detection terminal; and
a first resistor installed in series with the first capacitor between the one end of the auxiliary winding and the zero current detection terminal.

2. The DC/DC converter of claim 1, wherein the pulse modulator is configured to (i) shift the pulse signal to an OFF level depending on the feedback signal, and (ii) forcibly shift the pulse signal to an ON level when a state in which the zero current detection signal does not reach a predetermined first threshold voltage continues for a first predetermined time, and
wherein the starting control circuit is configured to, in the start-up of the DC/DC converter, superimpose an auxiliary signal on the zero current detection terminal such that a voltage of the zero current detection terminal exceeds the first threshold voltage each time the switching transistor is turned off.

3. The DC/DC converter of claim 2, wherein the primary side controller further comprises:
a comparator configured to assert a bottom detection signal when the zero current detection signal exceeds the first threshold voltage and then becomes lower than a second threshold voltage that is lower than the first threshold voltage; and
a blanking circuit configured to mask the bottom detection signal for a predetermined mask time after the switching transistor is turned off, and
wherein the starting control circuit is configured to superimpose the auxiliary signal on the zero current detection terminal such that a voltage of the zero current detection terminal becomes higher than the first threshold voltage after a lapse of the mask time from turning-off of the switching transistor.

4. The DC/DC converter of claim 2, wherein the starting control circuit is configured to generate the auxiliary signal using a voltage generated at one end of the auxiliary winding.

5. The DC/DC converter of claim 1, wherein the starting control circuit is configured to superimpose a high frequency component of a voltage generated at one end of the auxiliary winding on the zero current detection terminal.

6. The DC/DC converter of claim 1, wherein the starting control circuit comprises a high pass filter.

7. The DC/DC converter of claim 1, wherein the pulse modulator is configured to (ii) shift the pulse signal to an ON level when the zero current detection signal reaches a predetermined first threshold voltage and then a state in which the zero current detection signal becomes lower than a predetermined second threshold voltage occurs a predetermined number of times, and
wherein the starting control circuit is configured to control an electrical state of the zero current detection terminal such that, in the start-up of the DC/DC converter, a base line of a voltage of the zero current detection terminal exceeds the second threshold voltage.

8. The DC/DC converter of claim 7, wherein the starting control circuit is configured to, in the start-up of the DC/DC converter, shift the voltage of the zero current detection terminal to a high potential side.

9. The DC/DC converter of claim 7, further comprising:
a power supply circuit including a diode whose anode is connected to the one end of the auxiliary winding and a second capacitor connected to a cathode of the diode, and configured to generate a power supply voltage of the primary side controller,
wherein the starting control circuit is configured to control the base line of the voltage of the zero current detection terminal using the power supply voltage.

10. The DC/DC converter of claim 9, wherein the starting control circuit further comprises a second resistor installed between one end of the second capacitor and the zero current detection terminal.

11. The DC/DC converter of claim 1, further comprising a sense resistor installed in series with the switching transistor,
wherein the primary side controller further comprises a current detection terminal which receives a current detection signal corresponding to a voltage drop of the sense resistor, and
wherein the pulse modulator is a peak current mode modulator configured to (i) shift the pulse signal to an OFF level when the current detection signal reaches the feedback signal.

12. The DC/DC converter of claim 1, wherein the rectifier circuit comprises:
a synchronous rectifying transistor; and
a synchronous rectification controller configured to drive the synchronous rectifying transistor.

13. An electronic device, comprising:
a load;
a diode rectifier circuit configured to full-wave rectify a commercial AC voltage;
a smoothing capacitor configured to smooth an output voltage of the diode rectifier circuit to generate an DC input voltage; and
the DC converter of claim 1, configured to step down the DC input voltage to supply the stepped down voltage to the load.

14. A power adaptor, comprising:
a diode rectifier circuit configured to full-wave rectify a commercial AC voltage;
a smoothing capacitor configured to smooth an output voltage of the diode rectifier circuit to generate a DC input voltage; and
the DC converter of claim 1, configured to step down the DC input voltage to supply the stepped down voltage to the load.

15. An insulated DC/DC converter, comprising:
a transformer having a primary winding, a secondary winding, and an auxiliary winding;
a switching transistor installed between the primary winding of the transformer and a ground line;
a sense resistor installed in series with the switching transistor;
a rectifier circuit connected to the secondary winding of the transformer;
a photocoupler including a light emitting element and a light receiving element;
a feedback circuit configured to drive the light emitting element of the photocoupler such that an output voltage of the DC/DC converter approaches a target voltage;
a primary side controller having a feedback terminal which is connected to the light receiving element of the photocoupler and receives a feedback signal from the photocoupler, a current detection terminal which receives a current detection signal corresponding to a voltage drop of the sense resistor, a zero current detection terminal which receives a zero current detection signal corresponding to a voltage generated at one end of the auxiliary winding, and a peak current mode pulse modulator of a quasi-resonant mode configured to generate a pulse signal depending on the feedback signal, the current detection signal, and the zero current detection signal;
a first voltage dividing resistor installed between the one end of the auxiliary winding and the zero current detection terminal;
a second voltage dividing resistor installed between the zero current detection terminal and the ground line; and
a first resistor and a first capacitor installed in series and on a path parallel with the first voltage dividing resistor, between the one end of the auxiliary winding and the zero current detection terminal.

16. The DC/DC converter of claim 15, further comprising:
a power supply circuit including a diode whose anode is connected to the one end of the auxiliary winding and a second capacitor connected to a cathode of the diode, and configured to generate a power supply voltage of the primary side controller; and
a second resistor installed between one end of the second capacitor and the zero current detection terminal.

17. An insulated DC/DC converter, comprising:
a transformer having a primary winding, a secondary winding, and an auxiliary winding;
a switching transistor installed between the primary winding of the transformer and a ground line;
a feedback circuit configured to generate a feedback signal based on an output voltage of the secondary winding;
a primary side controller having a feedback terminal which receives the feedback signal from the feedback circuit, a zero current detection terminal which receives a zero current detection signal corresponding to a voltage generated at one end of the auxiliary winding, and a pulse modulator of a quasi-resonant mode configured to generate a pulse signal depending on the feedback signal and the zero current detection signal; and a starting control circuit which, in start-up of the DC/DC converter, electrically affects the zero current detection terminal such that an OFF time of the switching transistor lengthens, wherein the starting control circuit is configured to superimpose a high frequency component of a voltage generated at one end of the auxiliary winding on the zero current detection terminal.

18. The DC/DC converter of claim 17, wherein the pulse modulator is configured to (i) shift the pulse signal to an OFF level depending on the feedback signal, and (ii) forcibly shift the pulse signal to an ON level when a state in which the zero current detection signal does not reach a predetermined first threshold voltage continues for a first predetermined time, and wherein the starting control circuit is configured to, in the start-up of the DC/DC converter, superimpose an auxiliary signal on the zero current detection terminal such that a voltage of the zero current detection terminal exceeds the first threshold voltage each time the switching transistor is turned off.

19. The DC/DC converter of claim 18, wherein the starting control circuit is configured to generate the auxiliary signal using a voltage generated at one end of the auxiliary winding.

20. The DC/DC converter of claim 17, wherein the starting control circuit comprises a first capacitor installed between the one end of the auxiliary winding and the zero current detection terminal.

21. The DC/DC converter of claim 20, wherein the starting control circuit comprises a first resistor installed in series with the first capacitor between the one end of the auxiliary winding and the zero current detection terminal.

* * * * *